Figure 1:
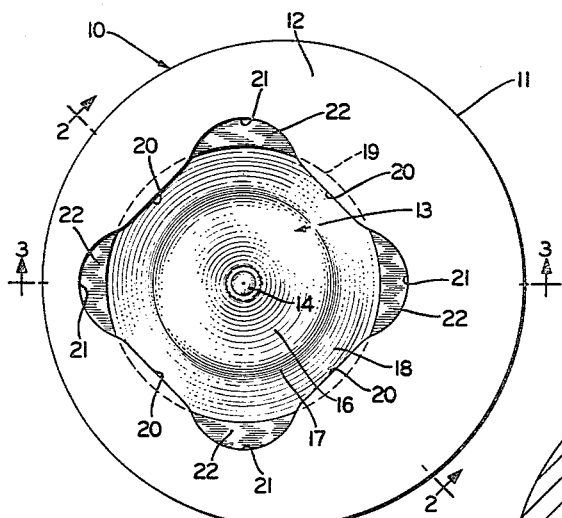

April 2, 1963

P. D. MADAK ETAL 3,083,700

INTERNAL COMBUSTION ENGINE CONSTRUCTION

Filed Dec. 8, 1961

3 Sheets-Sheet 1

INVENTORS
Paul D. Madak
Harry L. Cuthbert and
Robert E. Kerr

BY Frease, Bishop, Johns & Schick
ATTORNEYS

INVENTORS
Paul D. Madak
Harry L. Cuthbert and
Robert E. Kerr
BY
Frease, Bishop, Johns & Schick
ATTORNEYS April 2, 1963 P. D. MADAK ETAL 3,083,700
INTERNAL COMBUSTION ENGINE CONSTRUCTION
Filed Dec. 8, 1961 3 Sheets-Sheet 3

INVENTORS
Paul D. Madak
Harry L. Cuthbert and
Robert E. Kerr
BY
Frease, Bishop, Johns & Schick
ATTORNEYS 3,083,700
INTERNAL COMBUSTION ENGINE
CONSTRUCTION
Paul D. Madak, 341 Cayuga Ave. NW., Harry L. Cuthbert, 3117 Harrison Ave. NW., and Robert E. Kerr, 2133 32nd St. NW., all of Canton, Ohio
Filed Dec. 8, 1961, Ser. No. 161,328
19 Claims. (Cl. 123—32)
(Filed under Rule 47(b) and 35 U.S.C. 118)

Our invention relates to improvements in internal combustion engines, and more specifically to a piston construction for internal combustion engines of the injection type. Even more specifically our invention relates to an injection-type internal combustion engine construction wherein individual combustion chambers are formed in each of the pistons thereof.

Various prior piston constructions have been provided for injection-type internal combustion engines having various contours of combustion chambers formed at the head end of the individual pistons. The principal reason for the provision of these individual combustion chambers in each of the pistons is an attempt to provide a more thorough and complete mixing of the fuel and air in order to provide a maximum efficiency of combustion.

In this general type of piston construction, the combustion chamber is formed in such a manner as to attempt to circulate the air forced into the combustion chamber in a particular predetermined manner, and then by injecting the fuel into the combustion chamber and into this circulating air, it is intended to provide the maximum of thorough mixing therebetween prior to the actual combustion taking place. If, of course, the combustion commences prior to the fuel being thoroughly mixed with the air, incomplete combustion will result with the resulting problems of inefficiency, smoke and undesirable deposits of partially burned fuel.

Certain of the prior constructions of pistons having individual combustion chambers formed in the head of the piston have been provided with plain, semi-spherical chambers or recesses, with the fuel being injected generally laterally therein at a particular moment during the compression stroke. One of the principal difficulties with this form of construction is that, as the fuel is being injected into this form of chamber and against the walls thereof, a certain amount of the fuel is deflected upwardly over the plain edges of the chamber and, therefore, out of the combustion chamber and the turbulent air within the chamber.

This results in a certain amount of the fuel striking the cooler cylinder head, reducing the temperature as well as the mixing with air thereof, and thus reducing the efficiency of combustion. Also, a certain amount of this fuel is deposited on the top surface of the head of the piston and will run over the edges of the piston, thereby ultimately being deposited in the lubricating oil of the engine.

In order to eliminate these difficulties, certain other prior constructions have provided an overhanging edge or lip extending completely around the top edge of the combustion chamber at the top edge of the piston. In this manner, it was intended to contain the fuel within the combustion chamber until the proper mixture thereof with air could be accomplished.

The principal difficulty with this construction, however, which is also a further difficulty with the previously discussed plain semi-spherical form, is that it is impossible to control the combustion of the fuel-air mixture and without regard as to whether or not the proper fuel-air mixture has taken place. In both of these prior forms of construction, by forming the recesses or combustion chambers in particular manners, it is attempted to generate the movement of air within the recess or chamber in such a manner as to provide the maximum of fuel-air mixture prior to the combustion commencing, in an attempt to provide as nearly complete combustion as possible.

Again, in both of these prior forms of combustion chambers, the flow of air therein cannot be completely controlled as desired and the combustion will commence at one particular point where the fuel first reaches a combustible mixture, with this combustion then spreading throughout the chamber. This results, in both of these prior forms of construction, in combustion taking place at many areas within the chamber where insufficient air has been circulated for complete combustion to take place, again causing inefficiency, smoke and undesirable deposits of partially burned fuel.

Thus, in order to eliminate the problems with the prior constructions and provide the maximum of efficiency of combustion, it is desirable to provide a complete and proper fuel-air mixture at any point where combustion takes place, and this requires as full a control as possible of the combustion. Furthermore, it is desirable, in order to effect this more complete control of the combustion, to generate the combustion simultaneously from a series of predetermined locations in the combustion chamber where it is assured that the proper fuel-air mixture will have been accomplished, rather than having the combustion commence at a single indeterminable point within the chamber and generate indiscriminately from this single point.

It is, therefore, a general object of the present invention to provide a piston construction for injection-type internal combustion engines which eliminates the premature combustion of improper fuel-air mixtures by a predetermined control of the combustion within a recess or combustion chamber formed within the head end of the piston.

It is a primary object of the present invention to provide a piston construction for injection-type internal combustion engines in which a controlled combustion of a proper mixture of fuel and air is accomplished resulting in greatly increased efficiency.

It is a further object of the present invention to provide a piston construction for injection-type internal combustion engines in which a controlled combustion is accomplished which is substantially complete, thereby eliminating undesirable deposits of unburned fuel.

It is still a further object of the present invention to provide a piston construction for injection-type internal combustion engines in which the timing of the fuel injection is much less critical and will not appreciably effect the efficiency of combustion.

It is another object of the present invention to provide a piston construction for injection-type internal combustion engines in which the nozzle pressure of the fuel injection nozzles may be substantially reduced, resulting in a savings in cost of the injection nozzle constructions.

Finally, it is an object of the present invention to provide a piston construction for injection-type internal combustion engines which satisfies all of the foregoing objects in a relatively simple and efficient manner, and may be provided at a minimum of cost.

These and other objects are accomplished by the parts, constructions, arrangements, combinations and subcombinations comprising the present invention, the nature of which is set forth in the following general statement, preferred embodiment of which—illustrative of the best mode in which applicants have contemplated applying the principles—is set forth in the following description and illustrated in the accompanying drawings, and which is particularly and distinctly pointed out and set forth in the appended claims forming a part hereof.

In general terms, the improved piston construction for injection-type internal combustion engines comprising the present invention may be stated as including a piston head having an end surface with said piston head having a recessed generally cylindrical combustion chamber formed therein, opening at said head end surface. The combustion chamber is preferably generated about a central upstanding generally conical protuberance positioned spaced below the head end surface with the bottom wall of the chamber extending angled outwardly downwardly therefrom in a preferably flat annular surface, and then in an arcuate annular surface outwardly upwardly to an outwardly upwardly angled, preferably flat annular side wall surface.

The side wall surface terminates upwardly toward the head end surface in an arcuate inwardly upwardly curved annular surface, with the head end surface surrounding the combustion chamber being formed with alternate overhanging lip portions and cut-out outwardly extending recess portions. The recess portions preferably are curved arcuately outwardly from the combustion chamber and at the edges thereof blend arcuately into the overhanging lip portions, with there preferably being at least three such alternate overhanging lip and recess portions.

Thus, in vertical cross section, the combustion chamber is preferably generally toroidal in configuration as generated around the central protuberance thereof. Furthermore, any horizontal section taken through the chamber below the alternate lip and recess portions is preferably circular.

Finally, the piston construction includes injection nozzle means preferably generally aligned with the combustion chamber central protuberance and having fuel jet opening means for injecting fuel from this central position generally laterally beneath each of the combustion chamber overhanging lip portions and within the combustion chamber. Such fuel injection is preferably directed substantially midway between recess portions beneath each of the lip portions.

Figure 4:
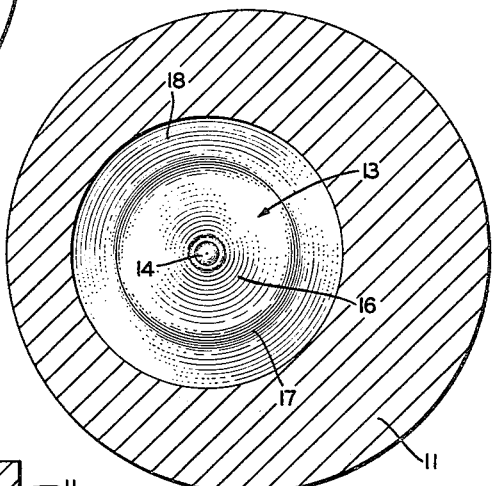
Figure 2:
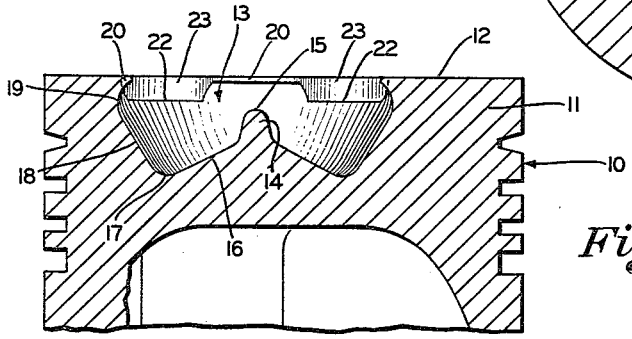
Figure 3:
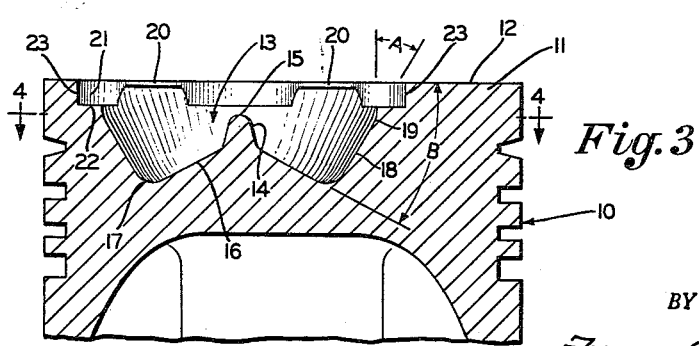
Figure 6:
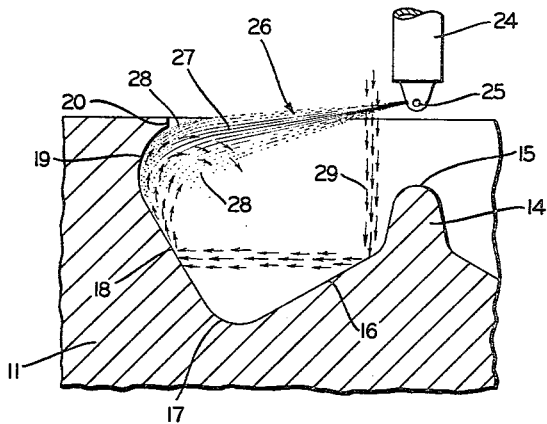
Figure 5:
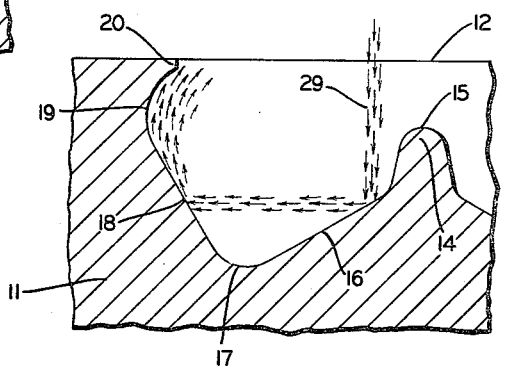
Figure 7:
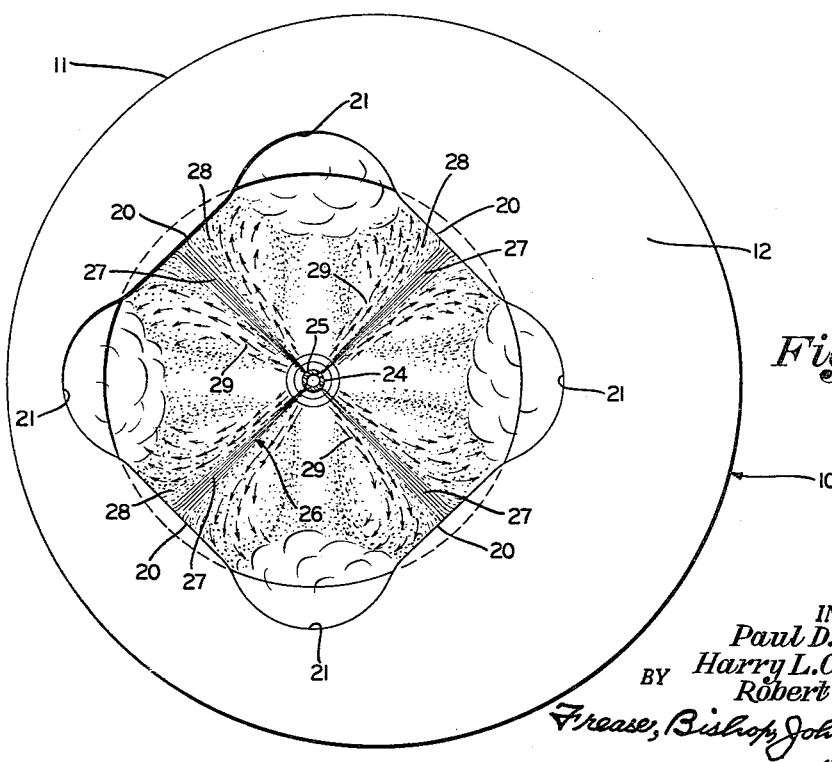
Figure 8:
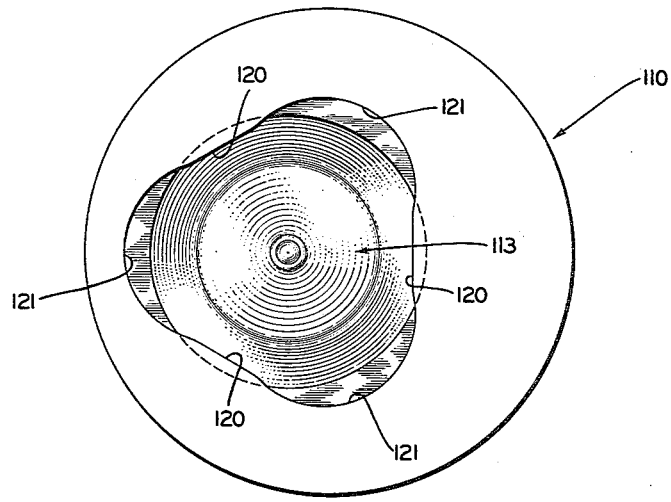

By way of example, an embodiment of the improved piston construction for injection-type internal combustion engines is illustrated in the accompanying drawings forming a part hereof, wherein like numerals indicate similar parts throughout the several views, and in which:

FIG. 1 is a top plan view of a piston incorporating the improvements of the present invention;

FIG. 2, a fragmentary vertical sectional view, part in elevation, looking in the direction of the arrows 2—2 in FIG. 1;

FIG. 3, a fragmentary vertical sectional view, part in elevation, looking in the direction of the arrows 3—3 in FIG. 1;

FIG. 4, a sectional view, part in elevation, looking in the direction of the arrows 4—4 in FIG. 3;

FIG. 5, an enlarged fragmentary sectional view, similar to FIG. 2, and illustrating the flow of air within the combustion chamber;

FIG. 6, a view similar to FIG. 5, but showing the combined flow of air and the mixture thereof with fuel being injected into the combustion chamber from an injection nozzle;

FIG. 7, an enlarged top plan view of the piston construction, similar to FIG. 1, but showing the movement of air within the combustion chamber, fuel being injected into the combustion chamber from a fuel injection nozzle, the mixture of the air and fuel, and the controlled generation of the combustion; and FIG. 8, a top plan view of a piston similar to FIG. 1, but with the combustion chamber having three alternate lip portions and three alternate recess portions rather than the four shown in FIG. 1.

Referring to FIGS. 1 through 4 of the drawings, a piston, generally indicated at 10, incorporating the principles of the present invention, is shown having a piston head 11 terminating upwardly in a circular head end surface 12.

The piston head 11 has a generally cylindrical combustion chamber, generally indicated at 13, formed therein, which combustion chamber is recessed within the piston head 11, opening upwardly through the head end surface 12.

The combustion chamber 13 is preferably generally about a central upstanding generally conically shaped protuberance 14, with the upper end 15 of the protuberance preferably being smoothly curved and spaced below the head end surface 12. The bottom wall of combustion chamber 13 preferably angles outwardly downwardly completely around the protuberance 14, preferably forming an annular flat, outwardly downwardly angled deflection surface 16.

Deflection surface 16 terminates outwardly in an outwardly upwardly arcuate annular surface 17, blending smoothly into the combustion chamber side wall, and an outwardly upwardly angled annular side wall surface providing the preferably flat, outwardly upwardly angled deflection surface 18.

Deflection surface 18 terminates upwardly toward the head end surface 12 in an arcuate inwardly upwardly curved annular surface 19. Thus, the combustion chamber 13 in any vertical cross section, preferably presents a generally toroidal configuration generated about the central protuberance 14 and is circular in any horizontal plane taken therethrough.

The head end surface 12 is formed with alternate overhanging lip portions 20 and cut-out outwardly extending recess portions 21, so that the lip portions 20 are substantially an upward continuation of the combustion chamber arcuate surface 19, whereas the surface 19 terminates upwardly at the recess portions 21, as can be clearly seen in FIGS. 2 and 3, respectively.

As shown in FIG. 3, the recess portions 21 extend outwardly from the main portion of the combustion chamber 13 in preferably flat bottom walls 22 which terminate outwardly in upwardly extending side walls 23. Side walls 23 terminate upwardly at the head end surface 12 and as shown in FIG. 1, in horizontal cross section, side walls 23 are arcuate in configuration, blending smoothly into the adjacent lip portions 20. Thus, the recess portions 21 preferably are uniform vertical depth throughout and are of maximum horizontal depth midway between the adjacent lip portions 20, decreasing progressively in horizontal depth to these adjacent lip portions.

In general terms, therefore, a combustion chamber 13 is provided in the head 11 of the piston 10 opening upwardly through the piston head end surface 12, and the combustion chamber 13 is symmetrical about a central protuberance 14, with the exception of the alternate lip portions 20 and recess portions 21. Furthermore, the combustion chamber 13 is provided with specifically positioned flat deflection surfaces 16 and 18, with the remainder of the surfaces of the combustion chamber 13 being arcuately curved as at the arcuate surface 17 and 19. Also, at the piston head end surface 12, the combustion chamber 13 is provided with the alternate overhanging lip portions 20 forming pockets thereunderneath, which lip portions 20 are separated by outwardly extending and upwardly opening recess portions 21 extending outwardly beyond the remainder of combustion chamber 13.

As shown in FIG. 6, a fuel injection nozzle 24 is positioned above the piston head end surface 12 preferably overlying the combustion chamber central protuberance 14. Nozzle 24 is provided with a series of fuel jet openings 25, preferably one such opening for each of the piston lip portions 20, and preferably positioned for injecting a spray of fuel beneath each of the lip portions 20 substantially midway between the adjacent recess portions 21.

Thus, as shown in FIGS. 6 and 7, as the piston 10 moves upwardly in the compression stroke and approaches top dead center, fuel jet streams 26 are directed substantially midway between the alternate recess portions 21 and beneath the lip portions 20 within the combustion chamber 13. As illustrated in both FIGS. 6 and 7, each of these jet streams 26 of fuel is made up of a laminar spray portion 27, which is the main concentrated portion of the spray, and this laminar spray portion is surrounded by a less dense or fog spray portion 28.

In operation of the improved piston construction of the present invention, as the piston 10 moves upwardly in the compression stroke, air is forced into the combustion chamber 13 generally in the pattern as indicated by the arrows 29 in FIG. 5. As indicated by arrows 29, the air will be forced downwardly into the combustion chamber 13 and strikes the flat deflection surface 16, being deflected from surface 16 to the flat deflection surface 18, and then upwardly beneath the lip portions 20 in the areas where these lip portions are provided. Thus, as piston 10 approaches top dead center in the compression stroke, the proper air movement in the combustion chamber 13 has been established, preparatory to injection of fuel from nozzle 24.

As shown in FIG. 6, as the piston 10 closely approaches the top dead center position, the fuel jet streams 26 are sprayed from openings 25 of the fuel injection nozzle 24, with these streams being directed beneath the lip portions 20 as previously described. This injection of the fuel jet streams 26 into this location of the combustion chamber 13, introduces the fuel spray into the previously described pattern of air movement, resulting in the mixing of the air and fuel.

In view of the lip portions 20 overhanging the edges of the combustion chamber 13, the laminar spray portions 27 of the fuel jet streams 26 will be prevented from spraying upwardly out of the combustion chamber as these spray portions strike the side wall of the chamber. Furthermore, in view of the particular pattern of air flow as indicated by the arrows 29, and the fact that the lip portions 20 deflect this air flow generally toward the center of the combustion chamber 13, the fog spray portions 28 of the fuel jet streams 26 which would tend to spray over or across the piston head end surface 12, are drawn by this particular air movement downwardly into the combustion chamber, again as illustrated in FIG. 6. Thus, in this manner virtually the entire fuel spray is concentrated into the combustion chamber 13.

Referring to FIG. 7, it can be seen that on this upward compression stroke of piston 10, the air movement at the edges as well as in the central part of the recess portions 21 is into these recess portions, so that, as the fuel jet streams 26 are sprayed into the combustion chamber 13, the fog spray portions 28 thereof closest to the recess portions 21 will be picked up by the air stream, forming an area of fuel-air mixture particularly rich in air. Thus, these areas at the edges of the recess portions 21 will form ignition points beginning the combustion of the fuel air mixture.

Furthermore, the combustion will generate from within and from the edges of these recess portions 21, with the movement of air beneath lip portions 20 continually picking up fuel and providing a feeding of fuel-air mixture to recess portions 21. For this reason, the combustion is virtually simultaneously begun from each of the edges of each of the recess portions 21, and once begun, generates within and from these recess portions, being continuously fed a fuel-air mixture from beneath the lip portions 20.

As a consequence, a completely thorough mixing of all portions of the fuel with air is accomplished totally within the combustion chamber 13 and prior to combustion of any given portion of fuel taking place. Furthermore, by controlling the combustion from the recess portions 21 and maintaining a feeding of a proper fuel-air mixture to these predetermined combustion areas, the combustion of the fuel is complete.

As is illustrated in the drawings, in order to obtain the maximum results with the piston construction of the present invention, it is preferred that the piston head end surface 12 where the combustion chamber 13 is formed extend at substantially a right angle to the vertical axis of piston 10, and that the central vertical axis of combustion chamber 13 is parallel to the vertical axis of the piston. It is not necessary for the central vertical axis of combustion chamber 13 to coincide with the vertical axis of piston 10, however, and the prime consideration in the location of the combustion chamber in the piston head 11 from this standpoint is where space can be found for mounting the fuel injection nozzle 24, so that the nozzle preferably overlies the combustion chamber central protuberance 14.

Further, in order to accomplish the ideal air movement within combustion chamber 13 as described above, it is thought that the angle "A," indicated in FIG. 3, which is the angle of the deflection surface 18 on the side wall of the combustion chamber 13, should be of the order of 20° to 35°, depending on the piston speed and piston diameter for which the improved construction is being designed. Still further, it is thought that angle "B," indicated in FIG. 3, should be in the order of 25° to 40°, also depending on the piston speed and diameter factors.

Also, to provide the optimum results with the use of the piston construction of the present invention, it is desirable to provide three or more alternate lip portions 20 and recess portions 21 in each piston. Further, it is thought that single fuel jet streams 26, directed substantially midway beneath each of the lip portions 20 is ideal, although it is possible in certain cases that several such fuel jet streams 26 might be introduced beneath each of the lip portions 20.

It has been found in use of the piston construction of the present invention that much greater latitude in injection timing of the fuel jet streams 26 is permitted with this construction than has been heretofore possible with prior constructions, while still maintaining the maximum of complete combustion. For these same reasons, it is believed that the nozzle pressure of the fuel injection nozzle 24 may be substantially reduced, probably to approximately half that used in prior constructions. Furthermore, the wide range of fuel injection timing permits lower cylinder pressures with the resultant advantage of making it possible to use cheaper materials of less required strength.

Still further, in view of the particular air movement accomplished within the combustion chamber 13 as previously described, this air movement tends to clean excess fuel from the fuel injection nozzle 24 and around the fuel jet openings 25 thereof, thereby keeping this nozzle cleaner, which results in greatly decreased maintenance time and cost. Finally, in view of the fact that the combustion commences at a series of control points on the combustion chamber 13 and is controlled by the combination of the recess portions 21 and lip portions 20 throughout the extent thereof, a much more complete combustion is accomplished than has heretofore been possible, thereby requiring approximately ten percent less fuel to derive equal horse power as compared to the prior constructions. Also, in view of the fact that there is less fuel used and more complete combustion, the exhaust temperatures are greatly reduced, resulting in considerable savings in construction and maintenance of the exhaust system.

In FIG. 8, a piston, generally indicated at 110, is shown with a generally cylindrical combustion chamber, generally indicated at 113, formed therein, with this combustion chamber having only three alternate overhanging lip portions 120 separated by three alternate recess portions 121. The contour of the combustion chamber 113 and the lip and recess portions 120 and 121 are the same as previously described, as well as the operation thereof taking into account the lesser number of lip and recess portions.

Thus, according to the principles of the present invention, a controlled combustion is provided which results generally in increased efficiency, eliminates the build-up of unburned fuel deposits, makes the timing of the fuel injection much less critical, and permits a reduction in the nozzle pressure of the fuel injection nozzles, as well as the other advantages hereinbefore discussed.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of preferred embodiment thereof, and the advantageous new and useful results obtained thereby, the new and useful construction and reasonable mechanical equivalents thereof obvious to those skilled in the art are set forth in the appended claims.

We claim:

1. Injection-type internal combustion engine construction including a piston having a head end terminating in a head end surface, the piston head end having a combustion chamber formed therein opening outwardly through the head end surface, the combustion chamber having bottom and side walls, spaced lip portions formed at the head end surface overhanging the chamber side wall separated by recess portions opening through the head end surface and into the chamber opening providing alternate overhanging lip and recess portions at the head end surface and around the chamber opening; and fuel injection nozzle means having at least one fuel jet directing means for each piston lip portion for directing a jet of fuel into the piston combustion chamber beneath each piston lip portion.

2. Injection-type internal combustion engine construction including a piston having a head end terminating in a head end surface, the piston head end having a combustion chamber formed therein opening outwardly through the head end surface, the combustion chamber having bottom and side walls, spaced lip portions formed at the head end surface overhanging the chamber side wall separated by recess portions extending outwardly from the side wall and opening through the head end surface and into the chamber opening providing alternate overhanging lip and outwardly extending recess portions at the head end surface and around the chamber opening; and fuel injection nozzle means having at least one fuel jet directing means for each piston lip portion for directing a jet of fuel into the piston combustion chamber beneath each piston lip portion.

3. Injection-type internal combustion engine construction including a piston having a head end terminating in a head end surface, the piston head end having a generally cylindrical combustion chamber formed therein opening outwardly through the head end surface, the combustion chamber having bottom and side walls, spaced lip portions formed at the head end surface overhanging the chamber side wall separated by recess portions extending outwardly from the side wall and opening through the head end surface and into the chamber opening providing alternate overhanging lip and outwardly extending recess portions at the head end surface and around the chamber opening; and fuel injection nozzle means having at least one fuel jet directing means for each piston lip portion for directing a jet of fuel into the piston combustion chamber beneath each piston lip portion.

4. Injection-type internal combustion engine construction including a piston having a head end terminating in a head end surface, the piston head end having a combustion chamber formed therein opening outwardly through the head end surface, the combustion chamber having bottom and side walls, an upstanding protuberance formed centrally in the chamber bottom wall, spaced lip portions formed at the head end surface overhanging the chamber side wall separated by recess portions opening through the head end surface and into the chamber opening providing alternate overhanging lip and recess portions at the head end surface and around the chamber opening; and fuel injection nozzle means having at least one fuel jet directing means for each piston lip portion for directing a jet of fuel into the piston combustion chamber beneath each piston lip portion.

5. Injection-type internal combustion engine construction including a piston having a head end terminating in a head end surface, the piston head end having a generally cylindrical combustion chamber formed therein opening outwardly through the head end surface, the combustion chamber having bottom and side walls, an upstanding generally conically shaped protuberance formed centrally in the chamber bottom wall spaced below the head end surface, spaced lip portions formed at the head end surface overhanging the chamber side wall separated by recess portions extending outwardly from the side wall and opening through the head end surface and into the chamber opening providing alternate overhanging lip and outwardly extending recess portions at the head end surface and around the chamber opening; and fuel injection nozzle means having at least one fuel jet directing means for each piston lip portion for directing a jet of fuel into the piston combustion chamber beneath each piston lip portion.

6. Injection-type internal combustion engine construction including a piston having a head end terminating in a head end surface, the piston head end having a combustion chamber formed therein opening outwardly through the head end surface, the combustion chamber having bottom and side walls, downwardly outwardly angled deflection surface means formed on the chamber bottom wall and upwardly outwardly angled deflection surface means formed on the chamber side wall for deflecting air from the chamber bottom wall to the chamber side wall, spaced lip portions formed at the head end surface overhanging the chamber side wall separated by recess portions opening through the head end surface and into the chamber opening providing alternate overhanging lip and recess portions at the head end surface and around the chamber opening; and fuel injection nozzle means having at least one fuel jet directing means for each piston lip portion for directing a jet of fuel into the piston combustion chamber beneath each piston lip portion.

7. Engine construction as defined in claim 6 in which the side and bottom wall angled deflection surface means are substantially flat deflection surfaces.

8. Injection-type internal combustion engine construction including a piston having a head end terminating in a head end surface, the piston head end having a generally cylindrical combustion chamber formed therein opening outwardly through the head surface, the combustion chamber having bottom and side walls, an upstanding protuberance formed centrally in the chamber bottom wall, downwardly outwardly angled deflection surface means formed on the chamber bottom wall outwardly surrounding said central protuberance and upwardly outwardly angled deflection surface means formed on the chamber side wall for deflecting air from the chamber bottom wall to the chamber side wall, spaced lip portions formed at the head end surface overhanging the chamber side wall separated by recess portions extending outwardly from the side wall and opening through the head end surface and into the chamber opening providing alternate overhanging lip and outwardly extending recess portions at the head end surface and around the chamber opening; and fuel injection nozzle means having at least one fuel jet directing means for each piston lip portion for directing a jet of fuel into the piston combustion chamber beneath each piston lip portion.

9. Engine construction as defined in claim 8 in which the central protuberance is generally conically shaped and is spaced below the head end surface; and in which the side and bottom wall angled deflection surface means are substantially flat deflection surfaces.

10. Injection-type internal combustion engine construction including a piston having a head end terminating in a head end surface, the piston head end having a combustion chamber formed therein opening outwardly through the head end surface, the combustion chamber having bottom and side walls, an upstanding protuberance formed centrally in the chamber bottom wall, downwardly outwardly angled deflection surface means formed on the chamber bottom wall outwardly of the central protuberance and upwardly outwardly angled deflection surface means formed on the chamber side wall for deflecting air from the chamber bottom wall to the chamber side wall, spaced lip portions formed at the head end surface overhanging the chamber side wall separated by recess portions opening through the head end surface and into the chamber opening providing alternate overhanging lip and recess portions at the head end surface and around the chamber opening; and fuel injection nozzle means having at least one fuel jet directing means for each piston lip portion for directing a jet of fuel into the piston combustion chamber beneath each piston lip portion.

11. Injection-type internal combustion engine construction including a piston having a head end terminating in a head end surface, the piston head end having a combustion chamber formed therein opening outwardly through the head end surface, the combustion chamber having bottom and side walls, at least three spaced lip portions formed at the head end surface overhanging the chamber side wall separated by recess portions opening through the head end surface and into the chamber opening providing alternate overhanging lip and recess portions at the head end surface and around the chamber opening; and fuel injection nozzle means having at least one fuel jet directing means for each piston lip portion for directing a jet of fuel into the piston combustion chamber beneath each piston lip portion.

12. Injection-type internal combustion engine construction including a piston having a head end terminating in a head end surface, the piston head end having a combustion chamber formed therein opening outwardly through the head end surface, the combustion chamber having bottom and side walls, at least three spaced lip portions formed at the head end surface overhanging the chamber side wall separated by recess portions extending outwardly from the side wall and opening through the head end surface and into the chamber opening providing alternate overhanging lip and outwardly extending recess portions at the head end surface and around the chamber opening; and fuel injection nozzle means having at least one fuel jet directing means for each piston lip portion for directing a jet of fuel into the piston combustion chamber beneath each piston lip portion.

13. Injection-type internal combustion engine construction including a piston having a head end terminating in a head end surface, the piston head end having a combustion chamber formed therein opening outwardly through the head end surface, the combustion chamber having bottom and side walls, an upstanding protuberance formed centrally in the chamber bottom wall, at least three spaced lip portions formed at the head end surface overhanging the chamber side wall separated by recess portions extending outwardly from the side wall and opening through the head end surface and into the chamber opening providing alternate overhanging lip and outwardly extending recess portions at the head end surface and around the chamber opening; and fuel injection nozzle means having at least one fuel jet directing means for each piston lip portion for directing a jet of fuel into the piston combustion chamber beneath each piston lip portion.

14. Injection-type internal combustion engine construction including a piston having a head end terminating in a head end surface, the piston head end having a combustion chamber formed therein opening outwardly through the head end surface, the combustion chamber having bottom and side walls, downwardly outwardly angled deflection surface means formed on the chamber bottom wall and upwardly outwardly angled deflection surface means formed on the chamber side wall for deflecting air from the chamber bottom wall to the chamber side wall, at least three spaced lip portions formed at the head end surface overhanging the chamber side wall separated by recess portions extending outwardly from the side wall and opening through the head end surface and into the chamber opening providing alternate overhanging lip and outwardly extending recess portions at the head end surface and around the chamber opening; and fuel injection nozzle means having at least one fuel jet directing means for each piston lip portion for directing a jet of fuel into the piston combustion chamber beneath each piston lip portion.

15. Injection-type internal combustion engine construction including a piston having a head end terminating in a head end surface, the piston head end having a generally cylindrical combustion chamber formed therein opening outwardly through the head end surface, the combustion chamber having bottom and side walls, an upstanding generally conically shaped protuberance formed centrally in the chamber bottom wall spaced below the head end surface, at least three spaced lip portions formed at head end surface overhanging the chamber side wall separated by recess portions extending outwardly from the side wall and opening through the head end surface and into the chamber opening providing alternate overhanging lip and outwardly extending recess portions at the head end surface and around the chamber opening; and fuel injection nozzle means having at least one fuel jet directing means for each piston lip portion for directing a jet of fuel into the piston combustion chamber beneath each piston lip portion.

16. Injection-type internal combustion engine construction including a piston having a head end terminating in a head end surface, the piston head end having a generally cylindrical combustion chamber formed therein opening outwardly through the head end surface, the combustion chamber having bottom and side walls, an upstanding generally conically shaped protuberance formed centrally in the chamber bottom wall spaced below the head end surface, substantially flat downwardly outwardly angled deflection surface means formed on the chamber bottom wall outwardly surrounding said central protuberance and substantially flat upwardly outwardly angled deflection surface means formed on the chamber side wall for deflecting air from the chamber bottom wall to the chamber side wall, at least three spaced lip portions formed at the head end surface overhanging the chamber side wall separated by recess portions extending outwardly from the side wall and opening through the head end surface and into the chamber providing alternate overhanging lip and outwardly extending recess portions at the head end surface and around the chamber opening, each recess portion having a substantially flat bottom wall outwardly of the chamber side wall and an arcuate side wall blending smoothly arcuately into the adjacent lip portions and terminating at the head end surface; and fuel injection nozzle means having at least one fuel jet directing means for each piston lip portion for directing a jet of fuel into the piston combustion chamber beneath each piston lip portion.

17. Injection-type internal combustion engine construction including a piston having a head end terminating in a head end surface, the piston head end having a combustion chamber formed therein opening outwardly through the head end surface, the combustion chamber having bottom and side walls, spaced lip portions formed at the head end surface overhanging the chamber side wall separated by recess portions extending outwardly from the side wall and opening through the head end surface and into the chamber opening providing alternate overhanging lip and outwardly extending recess portions at the head end surface and around the chamber opening, each recess portion having a substantially flat bottom wall outwardly of the chamber side wall and an arcuate side wall terminating at the head end surface; and fuel injection nozzle means having at least one fuel jet directing means for each piston lip portion for directing a jet of fuel into the piston combustion chamber beneath each piston lip portion.

18. Injection-type internal combustion engine construction including a piston having a head end terminating in a head end surface, the piston head end having a generally cylindrical combustion chamber formed therein opening outwardly through the head end surface, the combustion chamber having bottom and side walls, spaced lip portions formed at the head end surface overhanging the chamber side wall separated by recess portions extending outwardly from the side wall and opening through the head end surface and into the chamber opening providing alternate overhanging lip and outwardly extending recess portions at the head end surface and around the chamber opening, each recess portion having a substantially flat bottom wall outwardly of the chamber side wall and an arcuate side wall blending smoothly arcuately into the adjacent lip portions and terminating at the head end surface; and fuel injection nozzle means having at least one fuel jet directing means for each piston lip portion for directing a jet of fuel into the piston combustion chamber beneath each piston lip portion.

19. Injection-type internal combustion engine construction including a piston having a head end terminating in a head end surface, the piston head end having a generally cylindrical combustion chamber formed therein opening outwardly through the head end surface, the combustion chamber having bottom and side walls, at least three spaced lip portions formed at the head end surface overhanging the chamber side wall separated by recess portions extending outwardly from the side wall and opening through the head end surface and into the chamber opening providing alternate overhanging lip and outwardly extending recess portions at the head end surface and around the chamber opening, each recess portion having a substantially flat bottom wall outwardly of the chamber side wall and an arcuate side wall blending smoothly arcuately into the adjacent lip portions and terminating at the head end surface; and fuel injection nozzle means having at least one fuel jet directing means for each piston lip portion for directing a jet of fuel into the piston combustion chamber beneath each piston lip portion.

References Cited in the file of this patent
FOREIGN PATENTS
509,838      Great Britain _____ July 21, 1939